US011366769B1

(12) United States Patent
Klauser et al.

(10) Patent No.: US 11,366,769 B1
(45) Date of Patent: Jun. 21, 2022

(54) ENABLING PERIPHERAL DEVICE MESSAGING VIA APPLICATION PORTALS IN PROCESSOR-BASED DEVICES

(71) Applicant: Microsoft Technology Licensing, LLC, Redmond, WA (US)

(72) Inventors: Artur Klauser, Seattle, WA (US); Jason S. Wohlgemuth, Seattle, WA (US); Abolade Gbadegesin, Sammamish, WA (US); Gagan Gupta, Bellevue, WA (US); Soheil Ebadian, Kirkland, WA (US); Thomas Philip Speier, Wake Forest, NC (US); Derek Chiou, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/185,855

(22) Filed: Feb. 25, 2021

(51) Int. Cl.
*G06F 13/12* (2006.01)
*G06F 9/30* (2018.01)

(52) U.S. Cl.
CPC .......... *G06F 13/126* (2013.01); *G06F 9/3005* (2013.01); *G06F 13/122* (2013.01)

(58) Field of Classification Search
CPC ..... G06F 13/126; G06F 13/122; G06F 9/3005
See application file for complete search history.

(56) References Cited

U.S. PATENT DOCUMENTS

| 6,029,205 A | 2/2000 | Alferness et al. |
| 8,881,161 B1* | 11/2014 | Chudgar ............... G06F 9/4843 718/103 |
| 2011/0040913 A1* | 2/2011 | Chung ................ G06F 13/4022 710/264 |
| 2011/0154334 A1 | 6/2011 | Beale |

(Continued)

OTHER PUBLICATIONS

"An Embedded RISC-V Blog", Retrieved from: http://five-embeddev.com/riscv-isa-manual/latest/n.html, Dec. 2019, 5 Pages.

(Continued)

*Primary Examiner* — Henry Tsai
*Assistant Examiner* — John B Roche
(74) *Attorney, Agent, or Firm* — Withrow & Terranova, PLLC

(57) ABSTRACT

Enabling peripheral device messaging via application portals in processor-based devices is disclosed herein. In one embodiment, a processor-based device comprises a processing element (PE) including an application portal configured to logically operate as a message store, and that is exposed as an application portal address within an address space visible to a peripheral device that is communicatively coupled to the processor-based device. Upon receiving a message directed to the application portal address from the peripheral device, an application portal control circuit enqueues the message in the application portal. In some embodiments, the PE may further provide a dequeue instruction that may be executed as part of the application, and that results in a top element of the application portal being dequeued and transmitted to the application. Some embodi- (Continued)

Figure 1:
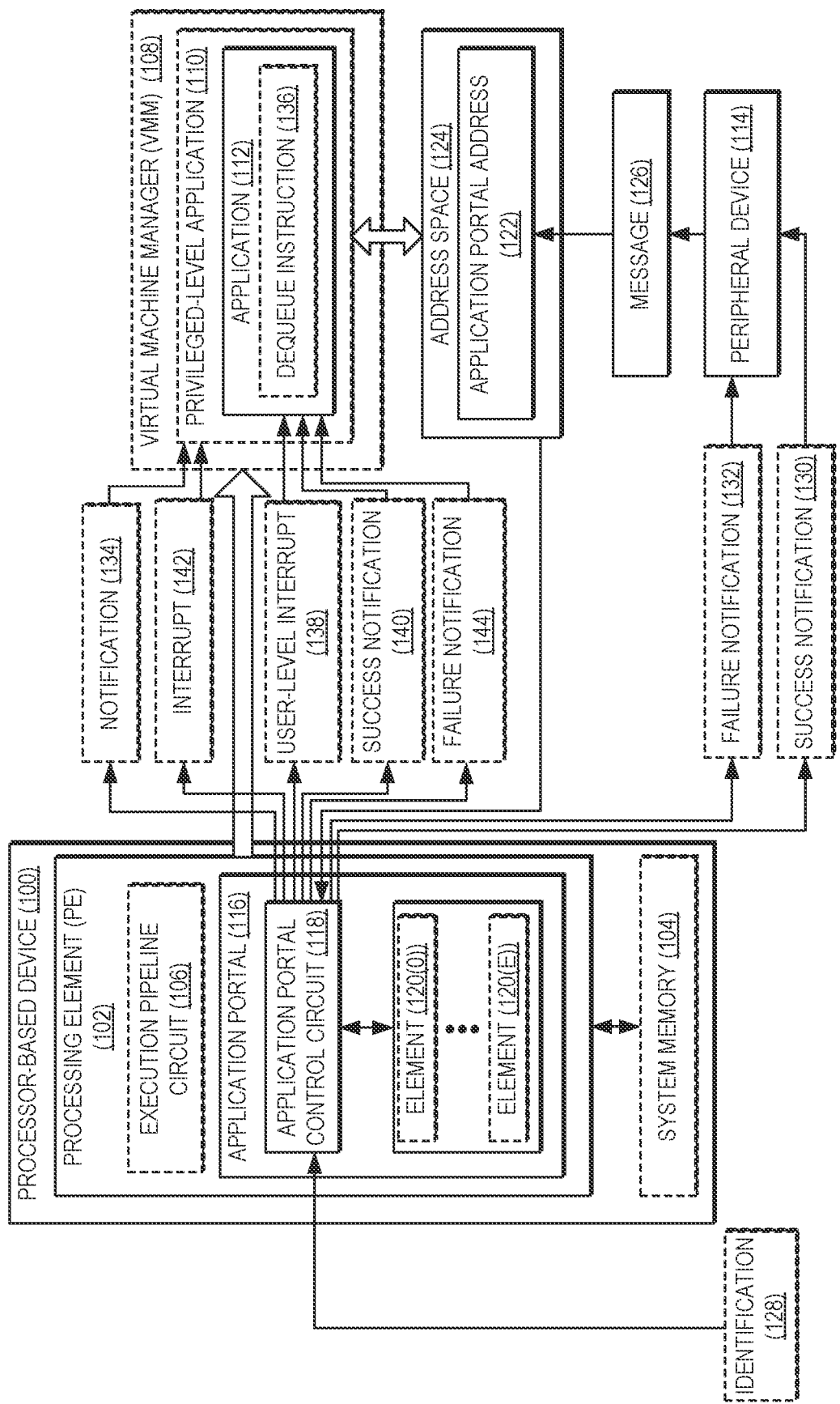

ments may provide further mechanisms for sending success and/or failure notifications, and/or for informing the application that the message has been enqueued.

20 Claims, 9 Drawing Sheets

(56) References Cited

U.S. PATENT DOCUMENTS

| | | | | |
|---|---|---|---|---|
| 2013/0145052 | A1* | 6/2013 | Aiken | G06F 9/4411 |
| | | | | 710/9 |
| 2014/0281243 | A1* | 9/2014 | Shalf | G06F 12/0842 |
| | | | | 711/122 |
| 2019/0317802 | A1 | 10/2019 | Bachmutsky et al. | |

OTHER PUBLICATIONS

Satran, et al.,"Interlocked Singly Linked Lists", Retrieved from: https://docs.microsoft.com/en-us/windows/win32/sync/interlocked-singly-linked-lists, May 31, 2018, 2 Pages.

"International Search Report and Written Opinion Issued in PCT Application No. PCT/US22/013956", dated Apr. 7, 2022, 11 Pages.

* cited by examiner

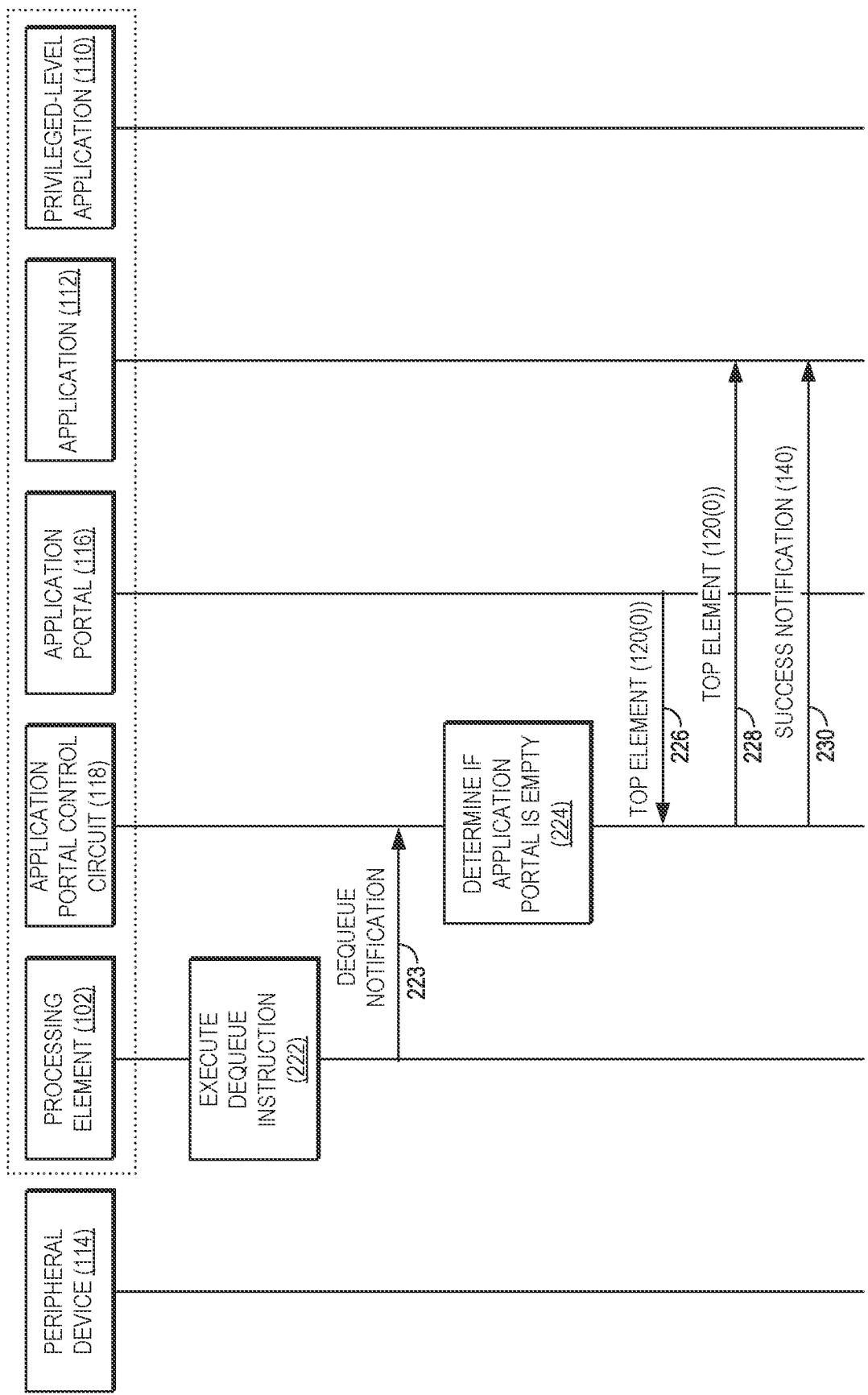

ENABLING PERIPHERAL DEVICE MESSAGING VIA APPLICATION PORTALS IN PROCESSOR-BASED DEVICES

FIELD OF THE DISCLOSURE

The technology of the disclosure relates to communications between a peripheral device and a user-level application executing on a processor-based device, and, more particularly, to mechanisms for device-to-application messaging.

BACKGROUND

Peripheral devices, such as hardware accelerator devices, are used conventionally to handle operations that may be offloaded by an application that is executing on a processor-based device. When the application determines that a particular operation on a specific dataset should be offloaded to the peripheral device, the application packages all data relevant to the operation (e.g., data buffer pointers for the dataset, the type of operation to be performed, and the like, as non-limiting examples) into a work item descriptor. The application then transmits the work item descriptor to the peripheral device, and may continue performing other tasks while the peripheral device performs the requested operation. When the peripheral device completes the requested operation, the peripheral device transmits a completion notification back to the application to inform the application that the operation is complete, and/or to provide a result of the operation to the application. The reverse work flow, in which a peripheral device offloads an operation to an application and subsequently receives a completion notification from the application, may also be employed for some tasks.

To maximize the benefit realized by offloading the operation from the application to the peripheral device (or vice versa), it is desirable to minimize the overhead involved in the communications flow between the application and the peripheral device. For example, the latency of communications between the application and the peripheral device may be optimized through the use of atomic store instructions provided by some instruction set architectures (ISAs) for efficiently submitting work item descriptors from the application directly to the peripheral device. However, conventional approaches may still encounter latency challenges when communicating the results of an operation, e.g., from the peripheral device back to the application. Such conventional approaches may involve either writing the completion notification to a notification location (e.g., a location in host memory, a device memory in a memory-mapped input/output (MMIO) address space, or a device register), or sending an interrupt to the processor-based device. In the former case, the application would be required to poll the notification location, which may be inefficient (especially in scenarios involving multiple outstanding completions, each with their own separate notification locations). In the latter case, both a context switch and a trip through a privileged software layer may be required, which increases the latency of the communications flow.

Accordingly, a more efficient mechanism for messaging between devices and applications is desirable.

SUMMARY

Exemplary embodiments disclosed herein include enabling peripheral device messaging via application portals in processor-based devices. In this regard, in one exemplary embodiment, a processor-based device comprises a processing element (PE) that includes an application portal comprising an application portal control circuit. The application portal is configured to logically operate as a message store (such as a first-in-first-out (FIFO) queue, as a non-limiting example), and is exposed as an application portal address within an address space that is visible to a peripheral device that is communicatively coupled to the processor-based device. Upon receiving a message directed to the application portal address from the peripheral device, the application portal control circuit enqueues the message in the application portal. Some embodiments may provide further mechanisms for determining whether the application portal is full before enqueuing the message, for sending a success notification and/or a failure notification to the peripheral device to indicate a result of the enqueuing operation, and/or for informing the application that the message has been enqueued. According to some embodiments disclosed herein, the PE may further provide a dequeue instruction that may be executed as part of the application, and that results in a top element of the application portal (if available) being dequeued and transmitted to the application. In this manner, the use of the application portal may reduce the latency of device-to-application communications and the consumption of computing resources.

In another exemplary embodiment, a processor-based device is provided. The processor-based device includes a PE that comprises an application portal that comprises an application portal control circuit, and that is configured to logically operate as a message store. The application portal is exposed as an application portal address within an address space that is visible to a peripheral device (e.g., an application address space of an application, as a non-limiting example) that is communicatively coupled to the processor-based device. The application portal control circuit is configured to, as an atomic operation, receive a first message directed to the application portal address from the peripheral device, and enqueue the first message in the application portal.

In another exemplary embodiment, a method for enabling peripheral device messaging via application portals in processor-based devices is provided. The method comprises receiving, by an application portal control circuit of an application portal of a PE of a processor-based device, a first message directed to an application portal address from a peripheral device communicatively coupled to the processor-based device, wherein the application portal address corresponds to the application portal, the application portal is configured to logically operate as a message store, and the application portal is exposed as the application portal address within an address space that is visible to the peripheral device. The method further comprises enqueuing the first message in the application portal.

In another exemplary embodiment, a non-transitory computer-readable medium is provided. The computer-readable medium stores thereon computer-executable instructions which, when executed by a processor-based device, cause the processor-based device to receive a first message directed to an application portal address from a peripheral device communicatively coupled to the processor-based device, wherein the application portal address corresponds to an application portal, the application portal is configured to logically operate as a message store, and the application portal is exposed as the application portal address within an address space that is visible to the peripheral device. The computer-executable instructions further cause the processor-based device to enqueue the first message in the application portal.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

Figure 3A:
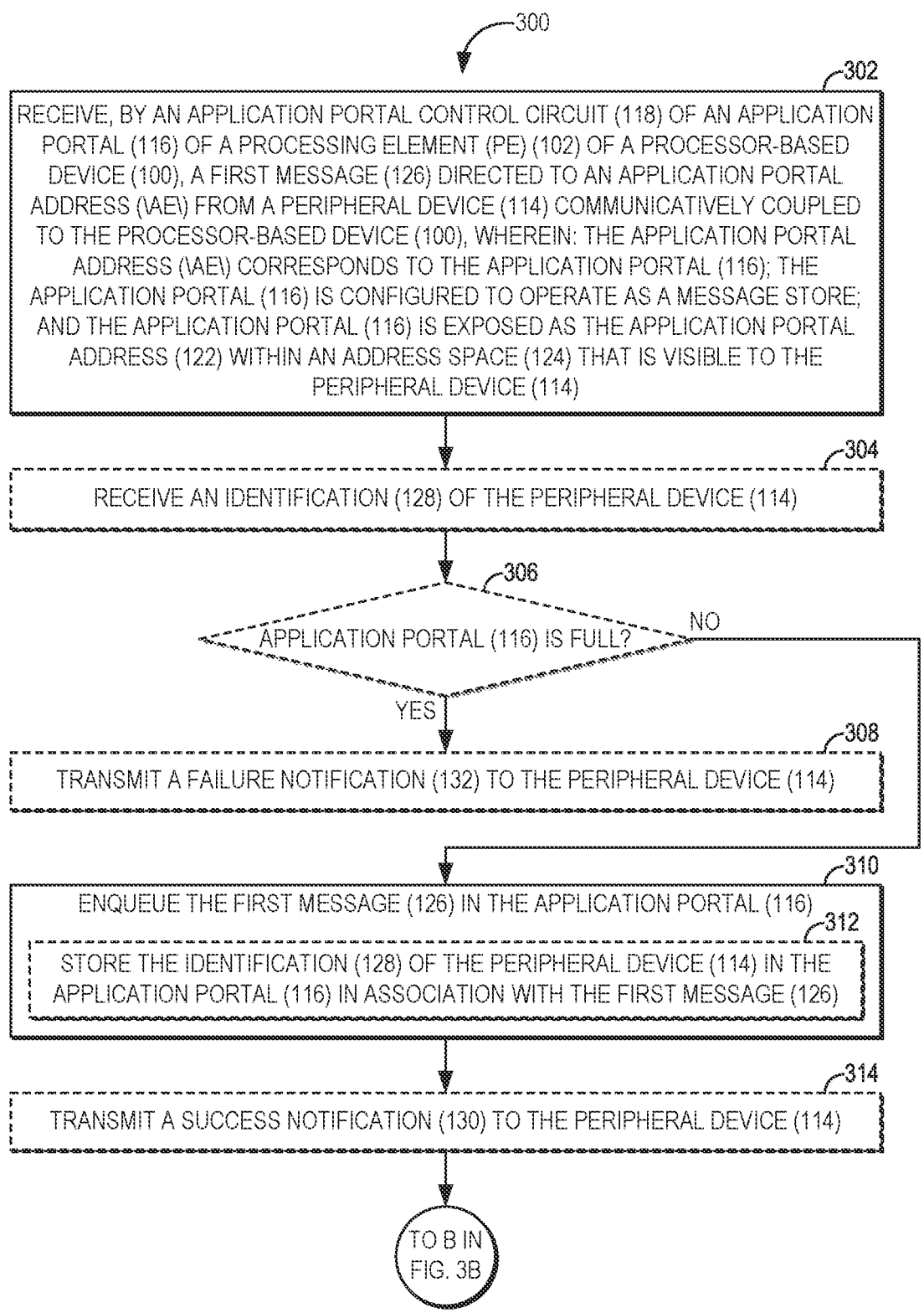
Figure 3B:
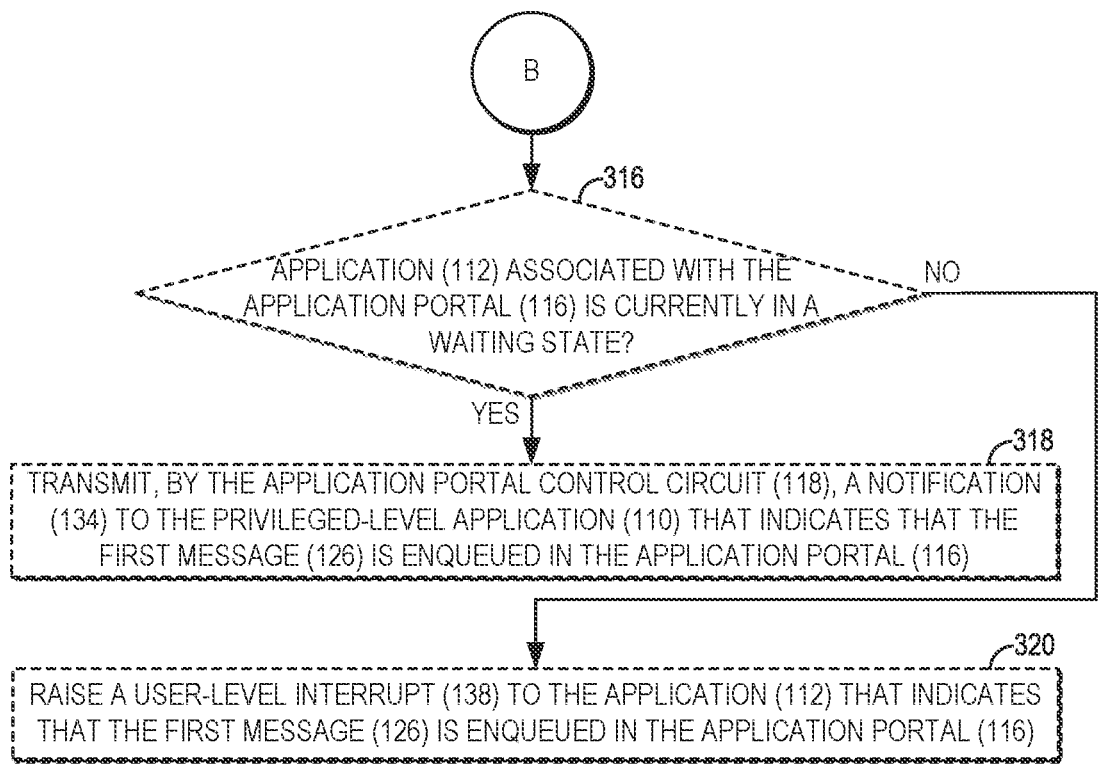
Figure 4:
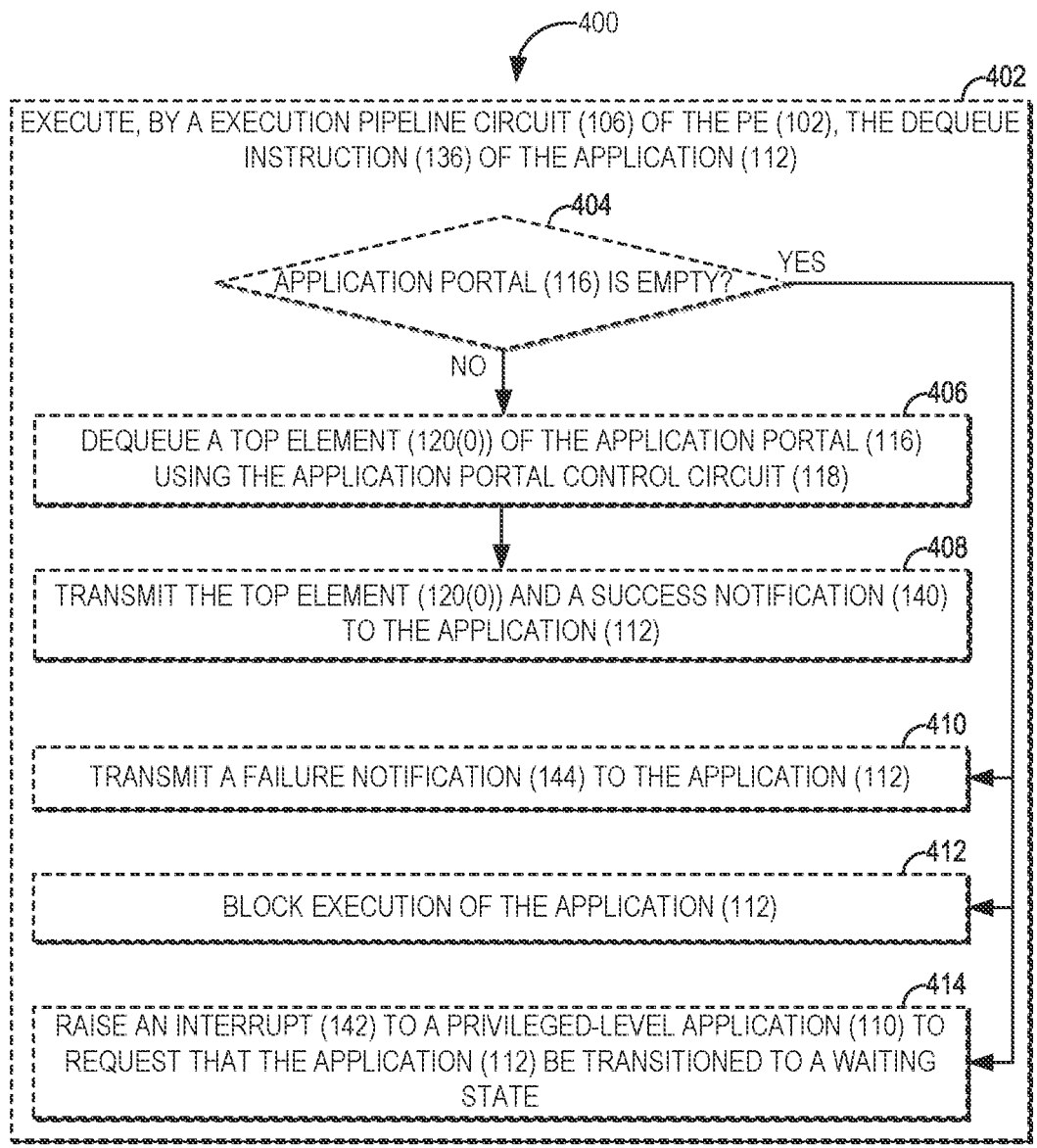
Figure 5:
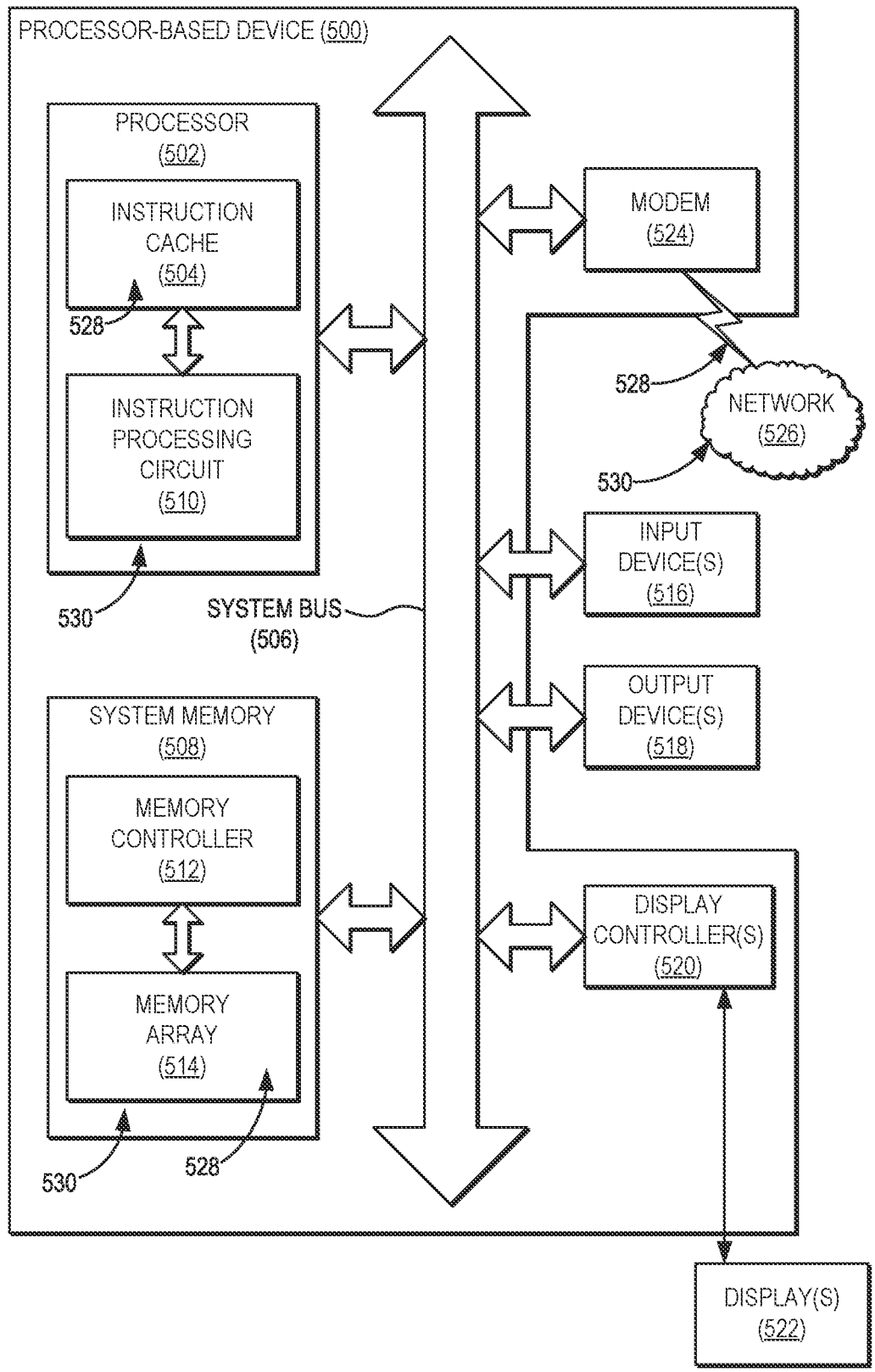

FIG. 1 provides a block diagram of an exemplary processor-based device that includes a processing element (PE) that includes an application portal configured to enable peripheral device messaging via application portals in processor-based devices, according to some embodiments;

FIG. 2A-2D provide a message flow diagram illustrating exemplary communications between and operations performed by elements of FIG. 1 to enable peripheral device messaging via application portals in processor-based devices, according to some embodiments;

FIGS. 3A and 3B provide a flowchart illustrating exemplary operations for enabling peripheral device messaging via application portals in processor-based devices, according to some embodiments;

FIG. 4 provides a flowchart illustrating further exemplary operations for executing the dequeue instruction of FIG. 1, according to some embodiments; and FIG. 5 is a block diagram of an exemplary processor-based device, such as the processor-based device of FIG. 1, that is configured to enable peripheral device messaging via application portals in processor-based devices.

DETAILED DESCRIPTION

Exemplary embodiments disclosed herein include enabling peripheral device messaging via application portals in processor-based devices. In this regard, in one exemplary embodiment, a processor-based device comprises a processing element (PE) that includes an application portal comprising an application portal control circuit. The application portal is configured to logically operate as a message store (such as a first-in-first-out (FIFO) queue, as a non-limiting example), and is exposed as an application portal address within an address space that is visible to a peripheral device that is communicatively coupled to the processor-based device. Upon receiving a message directed to the application portal address from the peripheral device, the application portal control circuit enqueues the message in the application portal. Some embodiments may provide further mechanisms for determining whether the application portal is full before enqueuing the message, for sending a success notification and/or a failure notification to the peripheral device to indicate a result of the enqueuing operation, and/or for informing the application that the message has been enqueued. According to some embodiments disclosed herein, the PE may further provide a dequeue instruction that may be executed as part of the application, and that results in a top element of the application portal (if available) being dequeued and transmitted to the application. In this manner, the use of the application portal may reduce the latency of device-to-application communications and the consumption of computing resources.

In this regard, FIG. 1 illustrates an exemplary processor-based device 100 that provides a processing element (PE) 102 for processing executable instructions. The PE 102 may comprise an individual processor core, comprising a logical execution unit and associated caches and functional units, of a central processing unit (CPU). The PE 102 of FIG. 1 is communicatively coupled to a system memory 104, and includes an execution pipeline circuit 106 that is configured to perform execution of an instruction stream comprising computer-executable instructions. Although not shown in FIG. 1, the execution pipeline circuit 106 in some embodiments may include a fetch stage for retrieving instructions for execution, a decode stage for translating fetched instructions into control signals for instruction execution, a rename stage for allocating physical register file (PRF) registers from a PRF, a dispatch stage for issuing instructions for execution, an execute stage for sending instructions and operands to execution units, and/or a commit stage for irrevocably updating the architectural state of the PE 102 based on the results of instruction execution. It is to be understood that some embodiments of the processor-based device 100 may comprise multiple PEs 102 rather than the single PE 102 shown in the example of FIG. 1.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 include elements in addition to those illustrated in FIG. 1. For example, the PE 102 may further include one or more functional units, instruction caches, unified caches, memory controllers, interconnect buses, and/or additional memory devices, caches, and/or controller circuits.

In the example of FIG. 1, the PE 102 is executing a virtual machine manager (VMM) 108 (e.g., a hypervisor executing on a host operating system (OS) executed by the PE 102) for providing virtualization functionality. Executing within the VMM 108 is a privileged-level application 110, which in some embodiments may comprise a virtual machine (VM) executing a guest OS. The privileged-level application 110, in turn, is executing an application 112 (i.e., a software application comprising computer-executable instructions that are executable by the PE 102). The application 112 of FIG. 1 is communicatively coupled to a peripheral device 114 via an interface (not shown) provided by the PE 102, such as an interface supporting the Peripheral Component Interconnect Express (PCIe) standard. The peripheral device 114 may comprise, e.g., a hardware accelerator device. In some embodiments, the peripheral device 114 may comprise a second PE (not shown) running a second application (not shown). While the application 112 in FIG. 1 is shown to be running under the privileged-level application 110, it is to be understood that, in some embodiments, the application 112 may comprise a user-level application running under a host OS or a virtualized guest OS, may comprise an OS itself, or may comprise a virtual machine manager such as the VMM 108.

In the course of execution, the application 112 may identify a processing task or operation that may be performed more efficiently or quickly by the peripheral device 114, and therefore may elect to offload the processing task to the peripheral device 114. However, as discussed above, conventional approaches for handling messaging between devices and applications may encounter latency challenges when communicating the results of the operation from the peripheral device 114 back to the application 112. Such conventional approaches may involve either writing the completion notification to a notification location in memory, or sending an interrupt to the processor-based device 100. In the former case, the application 112 would be required to poll the notification location, which may be inefficient (especially in scenarios involving multiple outstanding completions, each with their own separate notification locations). In the latter case, both a context switch and a trip through the privileged-level application 110 may be required, which increases the latency of the communications flow.

In this regard, the PE 102 is configured to enable peripheral device messaging via application portals in the processor-based device 100. To accomplish this, the PE 102 provides an application portal 116 that comprises an application portal control circuit 118. The application portal 116 comprises a hardware structure associated with the PE 102 that includes a plurality of elements 120(0)-120(E), and that is configured to logically operate as a message store (e.g., a FIFO queue, as a non-limiting example). Accordingly, devices such as the peripheral device 114 may use the application portal 116 to enqueue messages (e.g., fixed-size messages having a size of 64 bytes, as a non-limiting example) that are directed to applications such as the application 112. In the example of FIG. 1, the application portal 116 is illustrated as an integral element of the PE 102. However, it is to be understood that the application portal 116 in some embodiments may be located within another element of the processor-based device 100, such as a local interrupt controller (not shown), as a non-limiting example. In embodiments of the processor-based device 100 having multiple PEs 102, a single application portal 116 may be associated with more than one (1) of the multiple PEs 102. It is to be further understood that, in some embodiments, the processor-based device 100 may comprise a second peripheral device that comprises the application portal 116 to which the peripheral device 114 is communicatively coupled.

The application portal 116 is exposed as a physical address referred to herein as an application portal address 122, which is within an address space 124 that is visible to the peripheral device 114, and which can be mapped independently into an application address space of the application 112. The application portal 116 is associated with the application 112 using, for example, a same process address space identifier (PASID) as the application 112. Some embodiments may provide that the application portal 116 itself stores the plurality of elements 120(0)-120(E), while in some embodiments the application portal 116 embodies message store logic that relies on a backing store, such as the system memory 104, that actually stores the plurality of elements 120(0)-120(E). In the latter case, it is to be understood that sufficiently privileged software (such as, e.g., the privileged-level application 110) can configure the application portal 116 to point to host memory in either a physical address space or in a virtual address space available to the PE 102 with the same one- or two-stage address translation functionality available to the PE 102. According to some embodiments, the state of the application portal 116 may be saved and restored to facilitate live migration of virtual machines (VMs).

In exemplary operation, the peripheral device 114 sends a message 126 directed to the application portal address 122 of the application portal 116 for the application 112. The message 126 may comprise, as non-limiting examples, a notification that a requested operation has been completed by the peripheral device 114, and/or data indicating a result of the requested operation. The message 126 is received by the application portal control circuit 118, which enqueues the message 126 in the application portal 116 using an atomic write operation. According to some embodiments, the application portal control circuit 118 may also receive an identification 128 of the peripheral device 114. The identification 128 may comprise a PCIe requester identifier (RID), a bus/device/function (BDF) indication, an accelerator resource identifier (ID), and/or a PASID, as non-limiting examples. The identification 128 may be provided, e.g., by a PCIe root complex (not shown) as part of the message 126, or may be provided in a side channel (not shown) by the peripheral device 114, as non-limiting examples.

In some embodiments, the application portal control circuit 118 may determine whether the application portal 116 is full (i.e., none of the elements 120(0)-120(E) are currently available to store the message 126). If not, the application portal control circuit 118 may transmit a success notification 130 to the peripheral device 114 after enqueuing the message 126 to indicate that the enqueuing of the message 126 was successful. If the application portal 116 is full, the application portal control circuit 118 may transmit a failure notification 132 to the peripheral device 114 to indicate that the application portal 116 is full. The peripheral device 114 may then handle the failure notification 132 in an implementation-specific manner. For example, the peripheral device 114 may attempt to retry the transmission of the message 126 to the application portal address 122, or the peripheral device 114 may opt to escalate handling of the failed enqueuing attempt by raising an interrupt (not shown).

In some embodiments, the application portal 116 is considered "active" if the corresponding application 112 is currently in a running state on the PE 102, and conversely is considered "inactive" if the corresponding application 112 is currently in a waiting state on the PE 102 (e.g., if the PE 102 is multitasking among multiple applications, and another application besides the application 112 is currently in a running state). Thus, some embodiments may provide that privileged-level applications (such as the privileged-level application 110) executing on the PE 102 indicate which applications are in a running state (e.g., as part of a context switch code path, by setting appropriate address space identifiers on control registers (not shown) that are accessible by the application portal control circuit 118).

The application portal control circuit 118 in such embodiments may be further configured to determine whether the application 112 is in a waiting state, and may perform different operations, depending on whether the application 112 is in a waiting state or in a running state, after the message 126 is enqueued in the application portal 116. In some embodiments, if the application 112 is in a waiting state, the application portal control circuit 118 may transmit a notification 134 to the privileged-level application 110 that indicates that the message 126 is enqueued in the application portal 116. The notification 134 may comprise an interrupt, as a non-limiting example. In response to receiving the notification 134, the privileged-level application 110 may schedule the application 112 to transition to a running state.

In some embodiments, transmitting the notification 134 may be performed only in instances in which the application portal 116 crosses a specified threshold (e.g., when the application portal 116 transitions from empty to non-empty). This may avoid generating unnecessary interrupts when the application 112 is already scheduled to transition to a running state. Some embodiments may provide that the notification 134 is transmitted only when the occupancy of the application portal 116 is above a specified threshold (not shown), which may help prevent overflow of the application portal 116. The application portal control circuit 118 in some embodiments may opt to take no action if the application 112 is in a waiting state after the message 126 is enqueued in the application portal 116. This may be preferable in scenarios in which, e.g., interrupt generation has been disabled in a previous invocation of an interrupt handler that has already scheduled the application 112 to transition to a running state.

Some embodiments may provide that, if the application 112 is not in a waiting stage (i.e., is currently in a running state) after the message 126 is enqueued in the application portal 116, the application portal control circuit 118 may elect to take no action, under the assumption that the application 112 itself will occasionally check the application portal 116 for receipt of new messages using a dequeue instruction 136, discussed in greater detail below. In some embodiments, the application portal control circuit 118 may raise a user-level interrupt 138 to the application 112 that indicates that the message 126 is enqueued in the application portal 116. The user-level interrupt 138 may cause the control flow of the application 112 to divert to a previously configured interrupt handler (not shown) that is associated with processing messages queued in the application portal 116. To avoid unnecessary or excessive interrupts, some embodiments may provide that the application portal control circuit 118 raises the user-level interrupt 138 only if an occupancy level of the application portal 116 is below or above a specified occupancy threshold.

It is to be understood that, in embodiments in which the processor-based device 100 includes multiple PEs 102, the determination of how the application portal control circuit 118 selects a PE among the multiple PEs 102 as a target of a user- or system-level interrupt generated by the application portal control circuit 118 may be implementation-specific. For example, the PEs 102 may be ordered by a priority defined by software, or by metrics supplied by hardware (e.g., whether each PE 102 is active or inactive, a time of activation of the PEs 102, and/or a frequency of activation of the PEs 102, as non-limiting examples). The application portal control circuit 118 may then generate an interrupt for the highest-ranked PE(s) 102.

To enable the application 112 to access messages previously enqueued in the application portal 116, some embodiments may provide that the instruction set architecture (ISA) on which the processor-based device 100 is based defines a dequeue instruction, such as the dequeue instruction 136. Upon executing the dequeue instruction 136 as part of the application 112 using the execution pipeline circuit 106 of the PE 102, the application portal control circuit 118 may first determine whether the application portal 116 is empty. If not, the top element of the plurality of elements 120(0)-120(E) of the application portal 116 (e.g., the element 120(0)) is atomically dequeued by the application portal control circuit 118, which then transmits the top element 120(0) and a success notification 140 to the application 112. Some embodiments may provide that additional information, such as the identification 128 and/or other information provided via a side channel, may also be transmitted to the application 112.

If the application portal control circuit 118 determines that the application portal 116 is empty upon execution of the dequeue instruction 136, the application portal control circuit 118 may perform one or more operations in response. In some embodiments, the application portal control circuit 118 transmits a failure notification 144 to the application 112. Some embodiments may provide that the application portal control circuit 118 may block completion of the dequeue instruction 136 (e.g., until the application portal 116 receives a message to be delivered to the application 112). For instance, in some embodiments, the application portal 116 is configured to communicate with the execution pipeline circuit 106 to cause the dequeue instruction 136 to stall within the PE 102 until data becomes available in the application portal 116, at which point the dequeue instruction 136 is unblocked and continues execution. In some embodiments, the blocking of the application 112 may be subject to a timeout. By blocking completion of the dequeue instruction 136, the PE 102 may be able to enter a lower power state, or may be able to improve resource sharing between peer hardware threads sharing the PE 102. The application portal control circuit according to some embodiments may escalate to the privileged-level application 110 by raising an interrupt 142 to the privileged-level application 110 to request that the application 112 be transitioned to a waiting state. The privileged-level application 110 may then transition the application 112 to a waiting state.

While FIG. 1 illustrates the application portal 116 being used for messaging between the single peripheral device 114 and the application 112, it is to be understood that the application portal 116 in some embodiments may be used to enqueue messages from multiple peripheral devices 114 to the application 112. In this manner, the application 112 may consume fewer computing resources by accessing messages from the application portal 116 instead of having to poll multiple notification locations. It is to be further noted that, because the device-to-application messaging path described herein is largely symmetrical with conventional application-to-device messaging paths, some embodiments may provide for chaining of messaging paths between the application 112 and multiple peripheral devices 114, multiple PEs 102, and/or multiple other applications 112. For example, the application 112 may offload a processing operation to a first peripheral device, which completes a first portion of the processing operation and messages a second peripheral device to perform a second portion of the processing operation, which upon completion messages the application 112.

FIG. 2A-2D provide a message flow diagram illustrating exemplary communications among and operations performed by elements of FIG. 1 to enable peripheral device messaging via application portals in processor-based devices, according to some embodiments. In FIGS. 2A-2D, the peripheral device 114, the PE 102, the application portal control circuit 118, the application portal 116, the application 112, and the privileged-level application 110 of FIG. 1 are represented by vertical lines, with communications between element represented by captioned arrows and operations performed by each element represented by captioned blocks. For the sake of clarity, elements of FIG. 1 are referenced in describing FIGS. 2A-2D. It is to be understood that, in some embodiments, not all communications or operations illustrated in FIGS. 2A-2D may be performed, and/or may be performed in an order other than that illustrated in FIGS. 2A-2D.

Figure 2A:
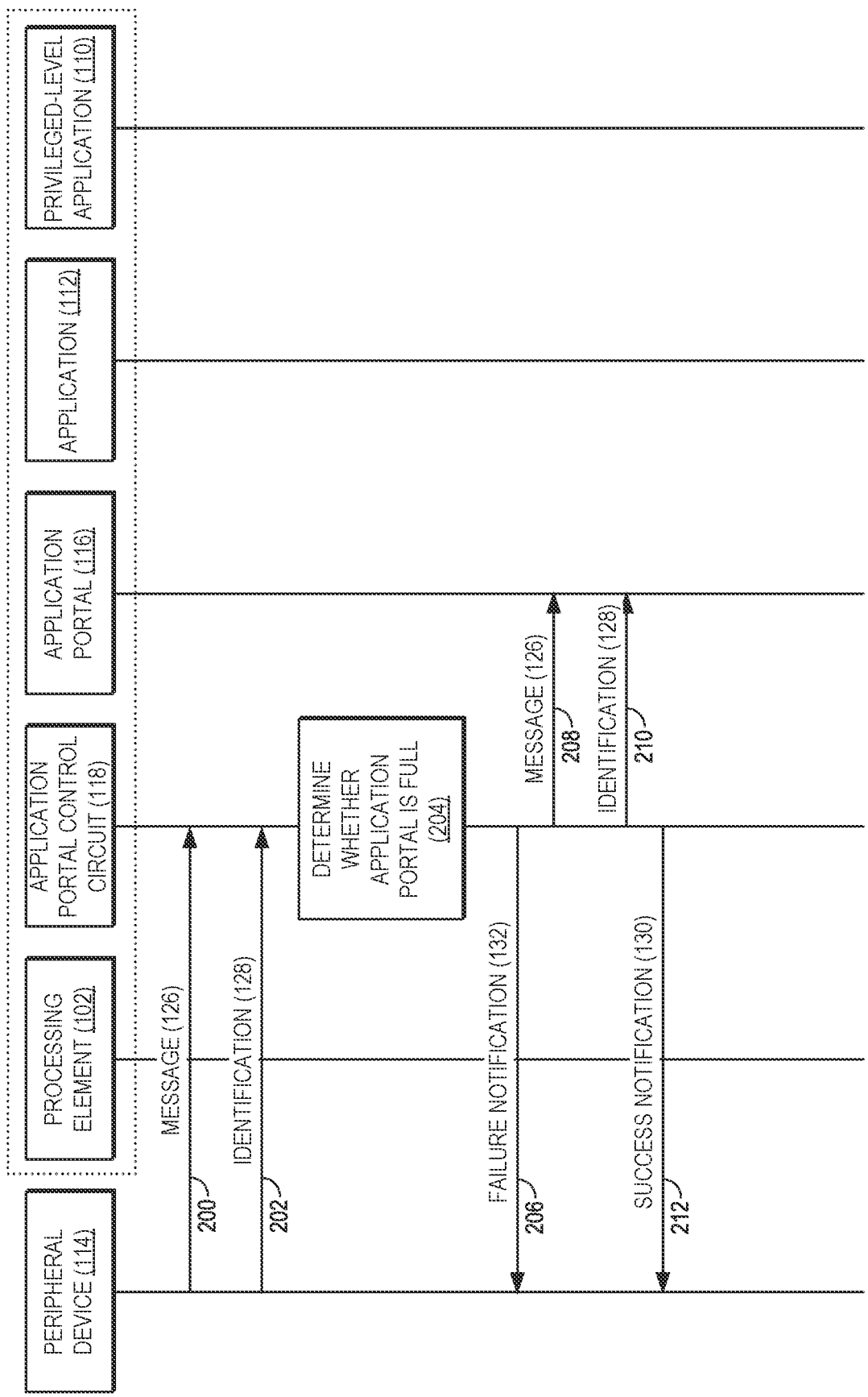

In FIG. 2A, operations begin with the peripheral device 114 transmitting a message (such as the message 126 of FIG. 1) to the application portal control circuit 118, as indicated by arrow 200. The message 126 may comprise, as non-limiting examples, a notification that a requested operation has been completed by the peripheral device 114, and/or data indicating a result of the requested operation. The application portal control circuit 118 in some embodiments may also receive an identification (such as the identification 128) of the peripheral device 114, as indicated by arrow 202. Although the identification 128 is shown in FIG. 2A as being provided by the peripheral device 114 directly to the application portal control circuit 118, it is to be understood that, in some embodiments, the identification 128 may be provided by, e.g., by a PCIe root complex (not shown) as part of the message 126. Upon receiving the message 126, the application portal control circuit 118 in some embodiments may determine whether the application portal 116 is full, as indicated by block 204. If so, the application portal control circuit 118 may send a failure notification (e.g., the failure notification 132 of FIG. 1) to the peripheral device 114, as indicated by arrow 206.

If the application portal 116 is not full, the application portal control circuit 118 enqueues the message 126 in the application portal 116, as indicated by arrow 208. In embodiments in which the application portal control circuit 118 receives the identification 128, the application portal control circuit 118 may also store the identification 128 of the peripheral device 114 in the application portal 116 in association with the message 126, as indicated by arrow 210. The application portal control circuit 118 in some embodiments may also transmit a success notification (such as the success notification 130) to the peripheral device 114, as indicated by arrow 212. Operations then continue in FIG. 2B.

Figure 2B:
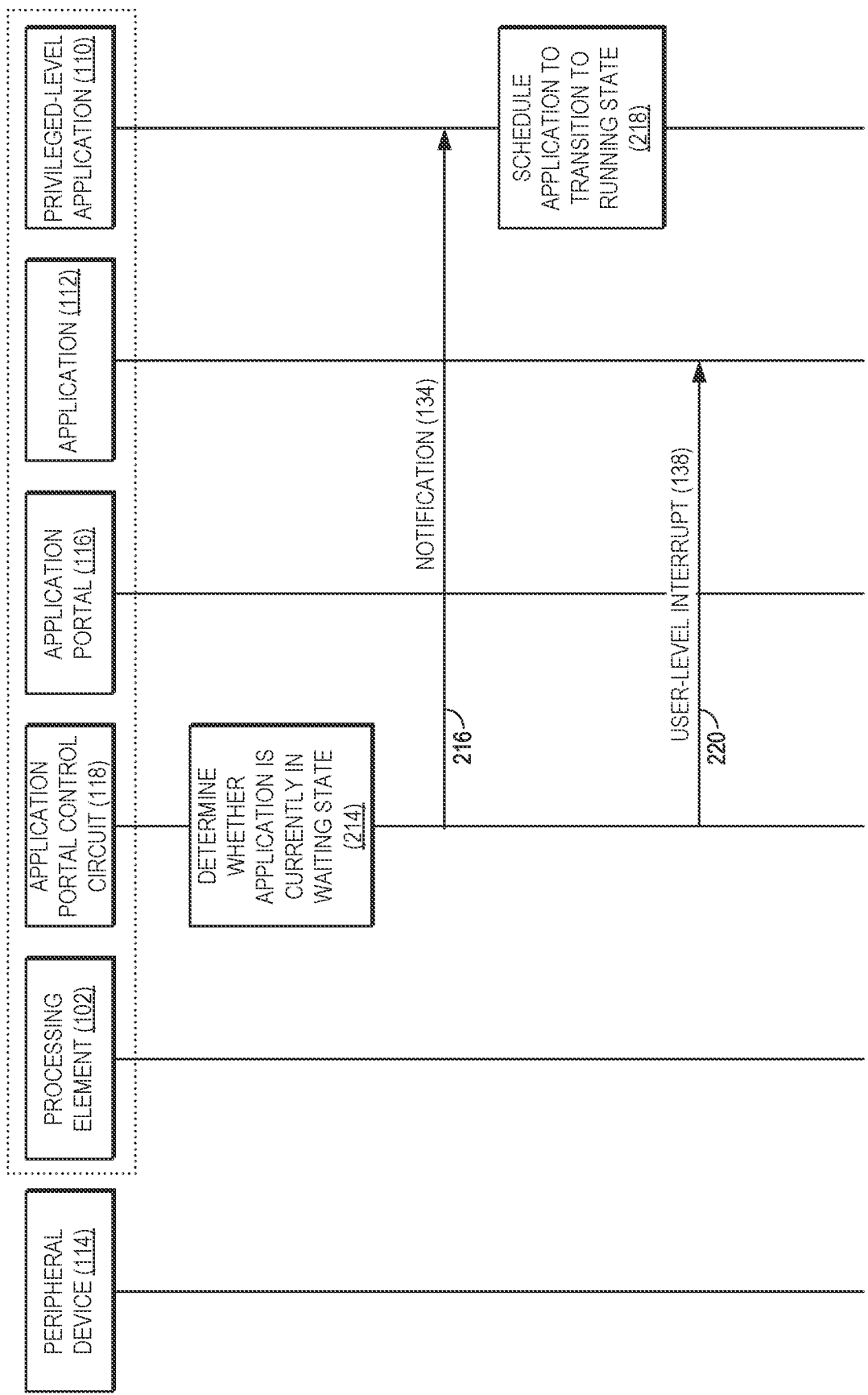

Turning now to FIG. 2B, embodiments of the processor-based device 100 of FIG. 1 may provide that the application portal control circuit 118 comprises mechanisms for notifying the application 112 that the message 126 has been enqueued in the application portal 116 and is awaiting processing by the application 112. Thus, in some such embodiments, the application portal control circuit 118 determines whether the application 112 associated with the application portal 116 is currently in a waiting state, as indicated by block 214. If so, the application portal control circuit 118 transmits a notification (such as the notification 134) to the privileged-level application 110 that indicates that the message 126 is enqueued in the application portal 116, as indicated by arrow 216. Upon receiving the notification 134, the privileged-level application 110 may schedule the application 112 to transition to a running state, as indicated by block 218. If the application 112 associated with the application portal 116 is currently not in a waiting state, the application portal control circuit 118 may raise a user-level interrupt (such as the user-level interrupt 138) to the application 112 that indicates that the message 126 is enqueued in the application portal 116, as indicated by arrow 220. Operations then continue in FIG. 2C.

In FIG. 2C, some embodiments provide that the PE 102 may execute the dequeue instruction 136 of the application 112, as indicated by block 222. The PE 102 transmits a dequeue notification to the application portal control circuit 118 to inform the application portal control circuit 118 that the PE 102 seeks to dequeue a top element (e.g., the element 120(0) of FIG. 1) from the application portal 116, as indicated by arrow 223. In response to execution of the dequeue instruction 136, the application portal control circuit 118 may first determine whether the application portal 116 is empty, as indicated by block 224. If not, the application portal control circuit 118 dequeues the top element (e.g., the element 120(0) of FIG. 1) from the application portal 116, as indicated by arrow 226. The application portal control circuit 118 then transmits the top element 120(0) to the application 112, as indicated by arrow 228, and may also transmit a success notification (such as the success notification 140 of FIG. 1) to the application 112, as indicated by arrow 230. Operations then continue in FIG. 2D.

Figure 2D:
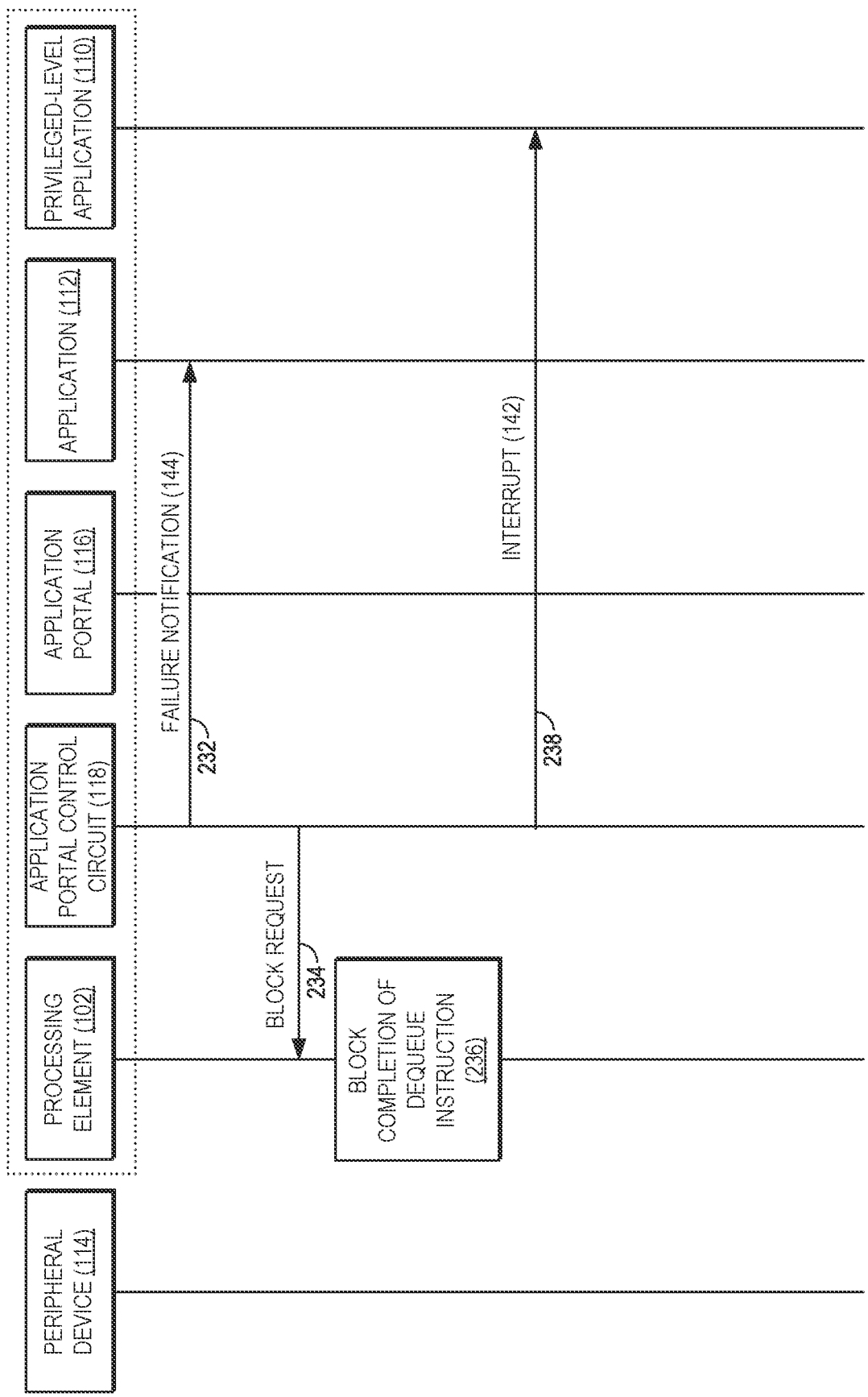

Referring now to FIG. 2D, if the application portal control circuit 118 determines that the application portal 116 is empty, the application portal control circuit 118 may perform one or more operations in response. In some embodiments, the application portal control circuit 118 may transmit a failure notification (e.g., the failure notification 144 of FIG. 1) to the application 112, as indicated by arrow 232. Some embodiments may provide that the application portal control circuit 118 may block execution of the application 112 by sending a block request to the PE 102 (as indicated by arrow 234), which may then block completion of the dequeue instruction 136, as indicated by block 236. According to some embodiments, the application portal control circuit 118 may raise an interrupt (such as the interrupt 142) to a privileged-level application (e.g., the privileged-level application 110 of FIG. 1) to request that the application 112 be transitioned to a waiting state, as indicated by arrow 238.

FIGS. 3A and 3B provide a flowchart 300 illustrating exemplary operations for enabling peripheral device messaging via application portals in processor-based devices, according to some embodiments. Elements of FIG. 1 are referenced in describing FIGS. 3A and 3B for the sake of clarity. In FIG. 3A, operations begin with the application portal control circuit 118 of the application portal 116 of the PE 102 of the processor-based device 100 receiving a first message (e.g., the message 126) directed to the application portal address 122 from the peripheral device 114 communicatively coupled to the processor-based device 100 (block 302). The application portal address 122 corresponds to the application portal 116, which is configured to logically operate as a message store, and which is exposed as the application portal address 122 within the address space 124 that is visible to the peripheral device 114. According to some embodiments, the application portal control circuit 118 may also receive an identification of the peripheral device 114 (e.g., the identification 128) (block 304). The identification 128 of the peripheral device 114 may comprise a PCIe requester identifier (RID), a bus/device/function (BDF) indication, an accelerator resource ID, and/or a process address space identifier (PASID), as non-limiting examples. The identification 128 may be provided, e.g., by a PCIe root complex (not shown) as part of the message 126, or may be provided in a side channel (not shown) by the peripheral device 114, as non-limiting examples.

In some embodiments, the application portal control circuit 118 next determines whether the application portal 116 is full (i.e., whether the backing store used to implement the application portal 116 has no available storage space) (block 306). If so, in such embodiments, the application portal control circuit 118 may transmit a failure notification (such as the failure notification 132) to the peripheral device 114 (block 308). However, if the application portal control circuit 118 determines at decision block 306 that the application portal 116 is not full, the application portal control circuit 118 then enqueues the message 126 in the application portal 116 (block 310). In some embodiments, the operations of block 310 for enqueuing the message 126 in the application portal 116 may include storing the identification 128 of the peripheral device 114 in the application portal 116 in association with the message 126 (block 312). Some embodiments may also provide that the application portal control circuit 118 transmits a success notification (such as the success notification 130) to the peripheral device 114 (block 314). Operations then continue at block 316 of FIG. 3B.

Referring now to FIG. 3B, some embodiments of the processor-based device 100 of FIG. 1 may provide mechanisms for notifying the application 112 that the message 126 has been enqueued in the application portal 116 and is awaiting processing by the application 112. Accordingly, in some embodiments, the application portal control circuit 118 may determine whether the application 112 associated with the application portal 116 is currently in a waiting state (block 316). This may occur, for example, if the PE 102 is multitasking among multiple applications, and another application besides the application 112 is currently in a running state. If the application portal control circuit 118 determines at decision block 316 that the application 112 is currently in a waiting state, the application portal control circuit 118 may transmit a notification (such as the notification 134) to the privileged-level application 110 that indicates that the message 126 is enqueued in the application portal 116 (block 318). The notification 134 may comprise, e.g., an interrupt raised to the privileged-level application 110, which, in response to receiving the interrupt, may ensure that the application 112 is scheduled to transition to a running state. However, if the application portal control circuit 118 determines at decision block 316 that the application 112 associated with the application portal 116 is currently not in a waiting state (i.e., the application 112 is currently in a running state), the application portal control circuit 118 may raise a user-level interrupt (such as the user-level interrupt 138) to the application 112 that indicates that the message 126 is enqueued in the application portal 116 (block 320).

To illustrate further exemplary operations of the processor-based device 100 for executing the dequeue instruction 136 of FIG. 1 according to some embodiments, FIG. 4 provides a flowchart 400. For the sake of clarity, elements of FIG. 1 are referenced in describing FIG. 4. In FIG. 4, operations begin with the execution pipeline circuit 106 of the PE 102 executing the dequeue instruction 136 of the application 112 (block 402). In some embodiments, the operations of block 402 for executing the dequeue instruction 136 comprise the application portal control circuit 118 first determining whether the application portal 116 is empty (i.e., whether the backing store used to implement the application portal 116 has no current contents) (block 404). If the application portal control circuit 118 determines at decision block 404 that the application portal 116 is not empty, the application portal control circuit 118 dequeues a top element (e.g., the element 120(0) of FIG. 1) from the application portal 116 (block 406). The application portal control circuit 118 then transmits the top element 120(0) and a success notification (such as the success notification 140 of FIG. 1) to the application 112 (block 408).

If the application portal control circuit 118 determines at decision block 404 that the application portal 116 is empty, the application portal control circuit 118 may perform one or more operations in response. Some embodiments may provide that the application portal control circuit 118 transmits a failure notification (e.g., the failure notification 144 of FIG. 1) to the application 112 (block 410). In some embodiments, the application portal control circuit 118 may block completion of the dequeue instruction 136 (block 412). The application portal control circuit 118 according to some embodiments may raise an interrupt (such as the interrupt 142) to a privileged-level application (e.g., the privileged-level application 110 of FIG. 1) to request that the application 112 be transitioned to a waiting state (block 414).

FIG. 5 is a block diagram of an exemplary processor-based device 500, such as the processor-based device 100 of FIG. 1, that enables peripheral device messaging via application portals. The processor-based device 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 500 includes a processor 502. The processor 502 represents one or more general-purpose processing circuits, such as a microprocessor, central processing unit, or the like, and may correspond to the PE 102 of FIG. 1. The processor 502 is configured to execute processing logic in instructions for performing the operations and steps discussed herein. In this example, the processor 502 includes an instruction cache 504 for temporary, fast access memory storage of instructions and an instruction processing circuit 510. Fetched or prefetched instructions from a memory, such as from a system memory 508 over a system bus 506, are stored in the instruction cache 504. The instruction processing circuit 510 is configured to process instructions fetched into the instruction cache 504 and process the instructions for execution.

The processor 502 and the system memory 508 are coupled to the system bus 506 and can intercouple peripheral devices included in the processor-based device 500. As is well known, the processor 502 communicates with these other devices by exchanging address, control, and data information over the system bus 506. For example, the processor 502 can communicate bus transaction requests to a memory controller 512 in the system memory 508 as an example of a peripheral device. Although not illustrated in FIG. 5, multiple system buses 506 could be provided, wherein each system bus constitutes a different fabric. In this example, the memory controller 512 is configured to provide memory access requests to a memory array 514 in the system memory 508. The memory array 514 is comprised of an array of storage bit cells for storing data. The system memory 508 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 506. As illustrated in FIG. 5, these devices can include the system memory 508, one or more input devices 516, one or more output devices 518, a modem 524, and one or more display controllers 520, as examples. The input device(s) 516 can include any type of input device, including, but not limited to, input keys, switches, voice processors, etc. The output device(s) 518 can include any type of output device, including, but not limited to, audio, video, other visual indicators, etc. The modem 524 can be any device configured to allow exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The modem 524 can be configured to support any type of communications protocol desired. The processor 502 may also be configured to access the display controller(s) 520 over the system bus 506 to control information sent to one or more displays 522. The display(s) 522 can include any type of display, including, but not limited to, a cathode ray tube (CRT), a liquid crystal display (LCD), a plasma display, etc.

The processor-based device 500 in FIG. 5 may include a set of instructions 528 that may be encoded with the reach-based explicit consumer naming model to be executed by the processor 502 for any application desired according to the instructions. The instructions 528 may be stored in the system memory 508, processor 502, and/or instruction cache 504 as examples of non-transitory computer-readable medium 530. The instructions 528 may also reside, completely or at least partially, within the system memory 508 and/or within the processor 502 during their execution. The instructions 528 may further be transmitted or received over the network 526 via the modem 524, such that the network 526 includes the computer-readable medium 530.

While the computer-readable medium 530 is shown in an exemplary embodiment to be a single medium, the term "computer-readable medium" should be taken to include a single medium or multiple media (e.g., a centralized or distributed database, and/or associated caches and servers) that store the one or more sets of instructions 528. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the PE described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
  a processing element (PE), comprising:
    an application portal comprising an application portal control circuit and configured to logically operate as a message store, the application portal exposed as an application portal address within an address space that is visible to a peripheral device that is communicatively coupled to the processor-based device; and
  the application portal control circuit configured to, as an atomic operation:
    receive a first message directed to the application portal address from the peripheral device; and
    enqueue the first message in the application portal.

2. The processor-based device of claim 1, wherein the application portal control circuit is further configured to:
  responsive to receiving the first message directed to the application portal address, determine that the application portal is not full; and
  subsequent to enqueuing the first message in the application portal, transmit a success notification to the peripheral device;
  wherein the application portal control circuit is configured to enqueue the first message responsive to determining that the application portal is not full.

3. The processor-based device of claim 1, wherein:
  the application portal control circuit is further configured to:
    determine that an application associated with the application portal is currently in a waiting state; and
    responsive to determining that the application associated with the application portal is currently in a waiting state, transmit a notification to a privileged-level application that indicates that the first message is enqueued in the application portal.

4. The processor-based device of claim 1, wherein the application portal control circuit is further configured to:
  determine that an application associated with the application portal is currently in a running state; and
  responsive to determining that the application associated with the application portal is currently in a running state, raise a user-level interrupt to the application that indicates that the first message is enqueued in the application portal.

5. The processor-based device of claim 1, wherein:
  an instruction set architecture (ISA) of the PE defines a dequeue instruction to atomically dequeue a top element from the application portal;
  an application associated with the application portal comprises the dequeue instruction; and
  the PE is further configured to execute the dequeue instruction of the application.

6. The processor-based device of claim 5, wherein the PE is configured to execute the dequeue instruction of the application by being configured to:
  determine that the application portal is not empty; and
  responsive to determining that the application portal is not empty:
    dequeue a top element from the application portal using the application portal control circuit; and
    transmit the top element and a success notification to the application.

7. The processor-based device of claim 5, wherein the PE is configured to execute the dequeue instruction of the application by being configured to:
  determine that the application portal is empty; and
  responsive to determining that the application portal is empty, transmit a failure notification to the peripheral device.

8. The processor-based device of claim 5, wherein the PE is configured to execute the dequeue instruction of the application by being configured to:
  determine that the application portal is empty; and
  responsive to determining that the application portal is empty, block completion of the dequeue instruction.

9. The processor-based device of claim 5, wherein the PE is configured to execute the dequeue instruction of the application by being configured to:
  determine that the application portal is empty; and
  responsive to determining that the application portal is empty, raise an interrupt to a privileged-level application to request that the application be transitioned to a waiting state.

10. The processor-based device of claim 1, wherein the application portal control circuit is further configured to:
  receive, from the peripheral device, a second message directed to the application portal address;
  responsive to receiving the second message, determine that the application portal is full; and
  responsive to determining that the application portal is full, transmit a failure notification to the peripheral device.

11. The processor-based device of claim 1, wherein:
  the application portal control circuit is further configured to receive an identification of the peripheral device; and
  the application portal control circuit is configured to enqueue the first message in the application portal by being configured to store the identification of the peripheral device in the application portal in association with the first message.

12. A method for enabling peripheral device messaging via application portals in processor-based devices, comprising:
  receiving, by an application portal control circuit of an application portal of a processing element (PE) of a processor-based device, a first message directed to an application portal address from a peripheral device communicatively coupled to the processor-based device, wherein:
    the application portal address corresponds to the application portal;
    the application portal is configured to logically operate as a message store; and
    the application portal is exposed as the application portal address within an address space that is visible to the peripheral device; and
  enqueuing the first message in the application portal.

13. The method of claim 12, further comprising:
  responsive to receiving the first message directed to the application portal address, determining that the application portal is not full; and
  subsequent to enqueuing the first message in the application portal, transmitting a success notification to the peripheral device;
  wherein enqueuing the first message is responsive to determining that the application portal is not full.

14. The method of claim 12, further comprising:
  determining, by the application portal control circuit, that an application associated with the application portal is currently in a waiting state; and
  responsive to determining that the application associated with the application portal is currently in a waiting state, transmitting, by the application portal control circuit, a notification to a privileged-level application that indicates that the first message is enqueued in the application portal.

15. The method of claim 12, further comprising:
  determining that an application associated with the application portal is currently in a running state; and
  responsive to determining that the application associated with the application portal is currently in a running state, raising a user-level interrupt to the application that indicates that the first message is enqueued in the application portal.

16. The method of claim 12, wherein:
  an instruction set architecture (ISA) of the PE defines a dequeue instruction to atomically dequeue a top element from the application portal;
  an application associated with the application portal comprises the dequeue instruction; and
  the method further comprises executing, by an execution pipeline circuit of the PE, the dequeue instruction of the application.

17. The method of claim 16, wherein executing the dequeue instruction of the application comprises:
  determining that the application portal is not empty; and
  responsive to determining that the application portal is not empty:
    dequeuing a top element from the application portal using the application portal control circuit; and
    transmitting the top element and a success notification to the application.

18. The method of claim 16, wherein executing the dequeue instruction of the application comprises:
  determining that the application portal is empty; and
  responsive to determining that the application portal is empty, transmitting a failure notification to the peripheral device.

19. The method of claim 16, wherein executing the dequeue instruction of the application comprises:
  determining that the application portal is empty; and
  responsive to determining that the application portal is empty, blocking completion of the dequeue instruction.

20. A non-transitory computer-readable medium, having stored thereon computer-executable instructions that, when executed, cause a processor-based device to:
  receive a first message directed to an application portal address from a peripheral device communicatively coupled to the processor-based device, wherein:
    the application portal address corresponds to an application portal;
    the application portal is configured to logically operate as a message store; and
    the application portal is exposed as the application portal address within an address space that is visible to the peripheral device; and
  enqueue the first message in the application portal.

* * * * *